United States Patent [19]

Haerr

[11] Patent Number: 5,141,761
[45] Date of Patent: Aug. 25, 1992

[54] METHOD FOR PACKAGING BACON

[76] Inventor: Louis G. Haerr, 947 Tim Tam Cir., Naperville, Ill.

[21] Appl. No.: 721,313

[22] Filed: Jun. 26, 1991

[51] Int. Cl.$^5$ .............. A21C 15/04; B65B 63/00
[52] U.S. Cl. .................................. 426/393; 53/435
[58] Field of Search ........... 53/127, 435, 517, DIG. 1; 426/107, 108, 121, 129, 234, 393, 410, 414

[56] References Cited

U.S. PATENT DOCUMENTS

| | | | |
|---|---|---|---|
| 2,830,910 | 4/1958 | Swanson | 426/129 X |
| 2,920,968 | 1/1960 | Grandy | 426/108 |
| 3,051,584 | 8/1962 | Tindall | 426/129 X |
| 3,054,681 | 9/1962 | Nelson et al. | 426/121 |
| 3,343,661 | 9/1967 | Nugarus | 426/129 X |
| 3,730,076 | 5/1973 | Levin | 99/347 |
| 3,916,030 | 10/1975 | Bard et al. | 426/129 X |
| 4,041,676 | 8/1977 | Smithers | 53/517 |
| 4,141,487 | 2/1979 | Faust et al. | 426/111 X |
| 4,720,410 | 1/1988 | Lundquist et al. | 426/129 X |
| 4,806,372 | 2/1989 | Strumskis | 426/129 |
| 4,857,342 | 8/1989 | Kappes | 426/129 X |

Primary Examiner—Robert L. Spruill
Assistant Examiner—Daniel B. Moon
Attorney, Agent, or Firm—Robert L. Marsh

[57] ABSTRACT

A method for packaging bacon is provided such that individual slices are made suitable to be cooked in a microwave oven. In accordance with this invention, immediately after slicing bacon from a pork belly, the individual bacon slices are frozen. The individual slices are then wrapped in a microwaveable sheet of material, and thereafter the individual wrapped slices are assembled together in a package suitable for sale.

3 Claims, 1 Drawing Sheet

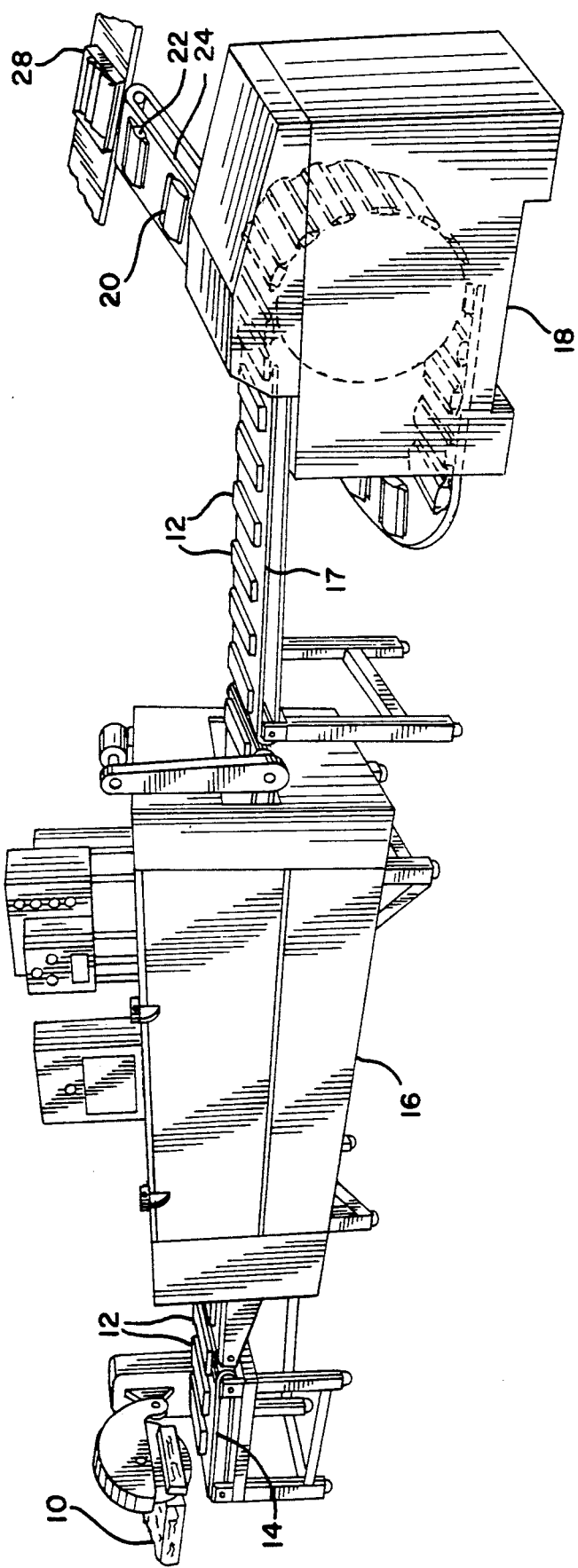

METHOD FOR PACKAGING BACON

The present invention relates generally to a method of packaging bacon so that it can be easily cooked in a microwave oven, and specifically relates to a method of wrapping individual slices of bacon.

BACKGROUND OF THE INVENTION

Bacon is customarily eaten in small quantities as a side dish to breakfast or lunch. This is largely because the meat, although tasty, has a high fat content making it very rich. When an individual wishes to cook a quick breakfast or lunch in a microwave oven, he or she may desire to cook bacon as part of the meal. Prior efforts however to package bacon such that one slice at a time may be removed and cooked in a microwave oven have been less than successful.

Bacon is customarily packaged for sale to the consumer in the form of overlapping slices packaged in cardboard containers having a weight of approximately one pound. Generally such packages are not adapted to be placed within a microwave oven. A typical bacon package is shown in U.S. Pat. No. 3,054,681. Containers which are suitable for packaging bacon and are adapted to be used within a microwave oven generally contain several slices of bacon packaged on top of an absorbing material, such as shown in U.S. Pat. Nos. 4,141,487 and 4,720,410. A package in which the slices of bacon are laid parallel to one another without overlapping is shown in U.S. Pat. No. 4,141,487, and a package in which the bacon has been arranged such that the slices overlap one another such is shown in U.S. Pat. No. 4,720,410.

Problems exist with either of the foregoing methods of packaging when the bacon is intended to be cooked in a microwave oven. Bacon packages which provide for a limited number of slices in side by side arrangements have been expensive to produce with the result that the cost of the product has deterred the saleability of the product. On the other hand, when bacon is arranged in overlapping relationship, the individual slices cannot be readily separated, especially when the product has been stored in a frozen condition. Even when not frozen the slices of bacon have a tendency to stick to one another, and as a result a user who wishes to cook only one or two slices of bacon has certain difficulties in removing the slices.

It is therefore desirable to provide a method of packaging bacon in containers holding numerous slices of bacon and weighing approximately one pound, and yet have the container suitable for storing in a freezer. Furthermore, it would be desirable to have a method of packaging bacon which would allow the removal of individual slices of frozen bacon which are suitably prepared for cooking in a microwave oven.

BRIEF DESCRIPTION OF THE INVENTION

The present invention is a method for packaging bacon so that individual slices may be cooked in a microwave oven. In accordance with this invention, immediately after slicing bacon from a pork belly, the individual bacon slices are frozen. In the preferred embodiment, the individual slices are then wrapped in a microwaveable sheet of material, and thereafter the individual wrapped slices are assembled together in a package suitable for sale.

BRIEF DESCRIPTION OF THE DRAWING

The features of the present invention which are believed to be novel are set forth in the impending claims, and the invention together with its objects and advantages may best be understood by reference to the following detailed description taken in conjunction with the accompanying drawing in which:

FIG. 1 is a schematic drawing of an assembly for packaging bacon in accordance with the present invention.

DETAILED DESCRIPTION OF THE INVENTION

Referring to FIG. 1, the process of packaging bacon commences with the slicing of a pork belly 10 into a plurality of individual slices of bacon 12. The slices 12 are conveyed along an appropriate conveyor 14 through a freezing chamber 16. The freezing chamber preferably uses liquid carbon dioxide or the like such as sold by Carbon Dioxide Corporation under the trademark Cryo-Shield to rapidly freeze the slices.

Thereafter, the frozen slices of bacon 12 are conveyed by a second conveyor 17 to a wrapping machine 18 in which the individual slices of bacon 12 are wrapped in a suitable material 20 which has been FDA approved for use in microwave ovens. The wrapping machine 18 may be similar to that provided under the trademark Econ-O-Matic manufactured by the Bemis Machinery Co. of Greenbay, Wis. A suitable material for wrapping the bacon which has been FDA approved for use in microwave ovens is manufactured by Dow Brands, Inc. under the trademark Saran Wrap. It is important that the wrapping 20 be folded around the individual slices of bacon 12 without sealing the edge of the material so that the wrapping may be easily removed after the bacon is cooked.

The wrapped frozen slices of bacon 22 are thereafter conveyed by a third conveyer 24 to a packaging process wherein the slices of bacon 22 are assembled in groups and packaged together in containers suitable for marketing to the public, such as one pound packages 28. It should be apparent that the individual slices of bacon 12 as cut from the pork belly 10 are soft and pliable and cannot be individually wrapped in a wrapping machine. After they have been frozen, the slices are rigid and thereafter they can easily be wrapped in such a machine. The individually wrapped slices of bacon can be kept in a frozen state for several months and the slices separate much more readily than unwrapped slices such that they may be removed individually as needed and used without thawing the entire package of bacon.

To cook a slice of bacon, six to ten holes are punched in one side of the wrapping 20 with a sharp knife, preferably the holes are punched in the side without the free ends of the wrapping material. The bacon slice is then placed on an absorbing material, such as a paper towel, with the side having the holes punched therein facing downwardly. Thereafter, the slices may be cooked in a microwave oven for the appropriate period of time, such as one or two minutes. The holes permit excess juices from the bacon to drain into the absorbing material while the wrapping around the slice permits the individual slice to cook within its own juices. Bacon cooked in its own juices has more flavorful taste and is not as readily burned and dried as frequently occurs in the course of cooking bacon in a microwave oven.

After cooking, the bacon is removed from the wrapping material and served.

While the present invention has been described in connection with one embodiment, it will be apparent to those skilled in the art that many changes and modifications may be made without departing from the true spirit and scope of the present invention. Therefore, it is the intent of the appended claims to cover all such changes and modifications which come within the true spirit and scope of the invention.

What is claimed:

1. A process for preparing bacon comprising the steps of:

slicing said bacon into individual slices while said bacon is in an unfrozen state, thereafter freezing said individual slices of bacon, and thereafter wrapping each of said individual slices of bacon in a separate sheet of material encircling the length of each of said individual slices of bacon in said sheet of material.

2. A process for preparing bacon in accordance with claim 1 and further comprising packaging several of said individually wrapped slices into a single package.

3. The process of preparing bacon in accordance with claim 2 wherein the individual slices of bacon are wrapped without sealing said individual wrapping.

* * * * *